Sept. 2, 1952  F. G. SCHULER  2,608,777
PRICE TAG AND MOLDING TRIM
Filed July 30, 1949

INVENTOR.
Fred G. Schuler.
BY
W. B. Harpman
ATTORNEY.

Patented Sept. 2, 1952

2,608,777

UNITED STATES PATENT OFFICE 2,608,777

PRICE TAG AND MOLDING TRIM

Fred G. Schuler, Youngstown, Ohio, assignor to Youngstown Manufacturing, Inc., Youngstown, Ohio, a corporation of Ohio Application July 30, 1949, Serial No. 107,742

3 Claims. (Cl. 40—16)

This invention relates to a price tag and moulding trim and more particularly to novel means for clamping or locking price tags in the trim.

The principal object of the invention is the provision of a price tag and moulding trim incorporating resilient means for securing price tags therein.

A further object of the invention is the provision of a price tag and moulding trim which may be applied to edges of shelves to form a finished surface thereon.

A still further object of the invention is the provision of a price tag and moulding trim incorporating resilient means for securing different sizes of price tags therein in non-slidable relation thereto.

The price tag and moulding trim disclosed herein is intended for application to the edges of shelves in retail establishments and particularly those of the self-service type wherein merchandise is displayed in readily acceptable locations upon shelves, counters and the like and prices are displayed by interchangeable price tags carried by the price tag and moulding trim. The price tag and moulding trim may be positioned in upright position or in inverted position, as desired, depending upon the height of the shelves with respect to the average eye level of the potential purchaser. The price tags are secured in the price tag and moulding trim by dual means, the price tag being bowed and the resiliency of the material thereof (usually Celluloid or a similar plastic) serving to hold the same in engagement with oppositely disposed channels formed in the upper and lower edges of the price tag and moulding trim.

Additionally, and most importantly, a resilient insert positioned longitudinally in one or both of the channels of the trim is distorted by the presence of the price tag and the price tag is thereby held against longitudinal movement with respect to the trim. The price tag is also securely held irregardless of its over-all size as undersized price tags are securely engaged by the distortion of the resilient material, which action is equally effective on normal or full sized price tags.

One of the principal difficulties encountered in the use of price tag and moulding trims and removable and replaceable price tags as heretofore known has been in the accidental displacement or deliberate movement of the price tags from one position to another, both of which actions are eliminated in the construction herein disclosed. It is thus an object of the present invention to provide a price tag and moulding trim in which the price tags may be securely held against accidental movement or against tampering by unauthorized persons.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein.

Figure 1:
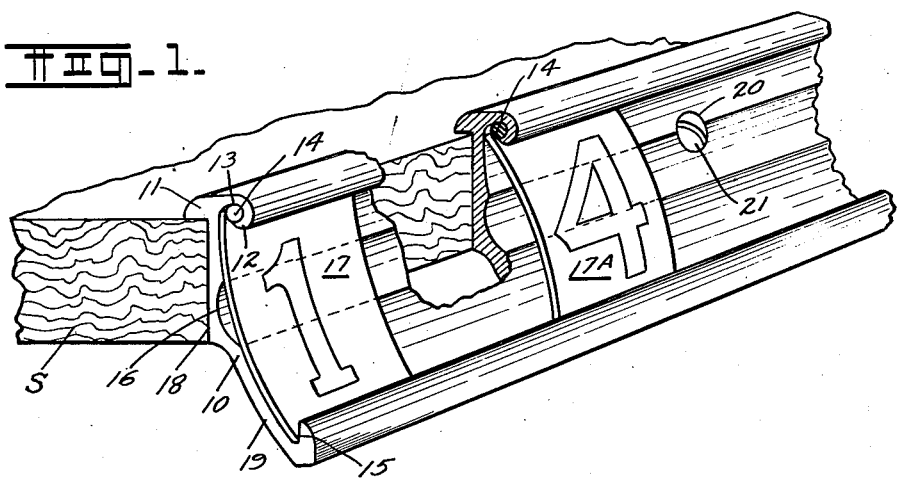
Figure 1 is a perspective view of a section of shelving showing the price tag and moulding trim secured thereto.
Figure 2:
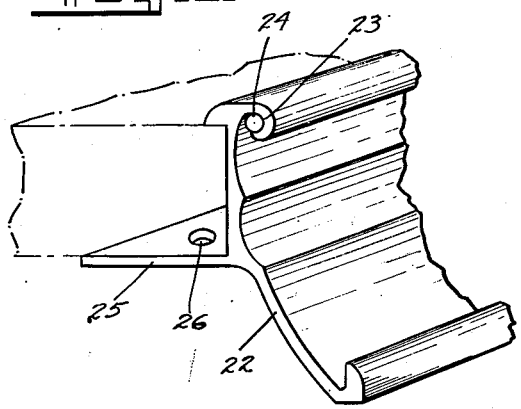
Figure 2 is a perspective view of a price tag and moulding trim having a modified mounting flange.

By referring to the drawings and Figures 1 and 2 in particular a preferred form of the invention will be seen to be applied to the forward edge of a section of shelving S. The price tag and moulding trim comprises a body member 10 of relatively great length as compared with its height and having a concave surface pattern. The upper edge of the trim 10 is provided with a modified T head 11, one portion of which overlies the shelving S and the other of which curves outwardly and downwardly, as indicated by the numeral 12, to form a partially enclosed channel 13 in which a resilient cord is positioned. The resilient cord is preferably of a diameter normally the same as or greater than the particularly closed channel 13 so that it is self-retaining therein.

The lower edge of the trim section 10 has a semi-V-shaped channel 15 therein lying in oppositely disposed relation with respect to the partially closed channel 13 heretofore described and forming one terminus of the concave surface of the trim 10. Substantially midway between the channels 13 and 15 there is a concave longitudinally extending depression 16 which provides means for convenient access to the rear edges of a price tag 17 positioned in clamped relation to the trim section 10. The concave longitudinally extending depression 16 permits the application of a tool (not shown) beneath the price tag 17 so that the same may be snapped out of the trim 10 when desired. In the right hand portion of Figure 1 a price tag 17A is shown loosely positioned in the trim section 10 with its lower edge engaged in the semi-V-shaped channel 15 and its upper edge partially engaged in the partially closed channel 13.

It will occur to those skilled in the art that when the price tag 17A is bowed in the opposite direction as by pushing the same against the concave surface of the trim 10, it will alter its position to conform thereto with the result that the upper edge of the price tag 17A will move further into the partially closed channel 13 and thereby distort the resilient cord 14. A tag in such position is shown in the left hand portion of Figure 1 and indicated by the numeral 17 as heretofore described.

The resilient cord 14 as disclosed herein may be formed of resilient material such as rubber in a continuous length equal or greater to the overall length of the trim section 10 in which it is applied and is easily and inexpensively positioned in the partially closed channel 13 by stretching the same lengthwise so as to reduce the effective diameter thereof and then moving it sidewardly into the partially closed channel 13 where it is released and allowed to reassume its normal diameter. It thus becomes self-retaining in the partially closed channel 13 and in position to properly engage the edges of the price tags 17 as they are inserted therein and forced upwardly alongside thereof.

The back of the trim section 10 is partially flat and partially curved, the flat surface being indicated by the numeral 18 and the curved surface by the numeral 19. It will be observed that the flat surface 18 extends over a sufficient area of the back of the trim 10 to provide proper abutment against the forward edge of the shelf S.

It will occur to those skilled in the art that the price tag and moulding trim incorporating the resilient clamping means for the price tags may be mounted on shelving by various mounting means and in Figure 1 of the drawings the trim section 10 is shown with one of a plurality of openings 20 through which screws 21 are positioned.

Another form of mounting is disclosed in the modification illustrated in Figure 2 and by referring thereto it will be seen that a price tag and moulding trim including a body member 22 having a partially closed channel 23 and a resilient member 24 therein is provided with a rearwardly extending flange 25 which in turn is perforated at intervals as at 26 so that fasteners may be positioned therethrough to engage the bottom of the shelf on which the device is positioned. The front surface of the price tag and moulding trim 22 is identically the same as that heretofore described in connection with Figure 1 of the drawings and price tags are positioned therein and removed therefrom in the same manner.

Figure 3:
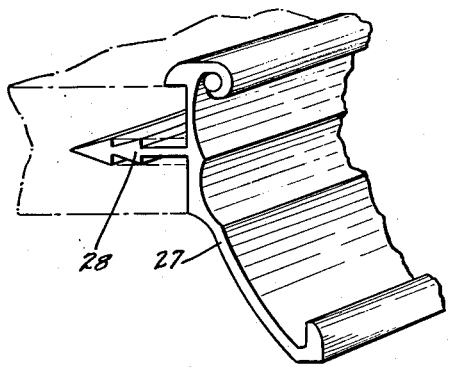
Figure 3 is a perspective view of a price tag and moulding trim having a modified mounting flange.

In Figure 3 of the drawings a further modification of the price tag and moulding trim will be seen to comprise a body member 27 having a barbed flange 28 positioned rearwardly thereon and adapted to be engaged in a narrow groove or slot formed in the leading edge of the shelf on which the trim is to be mounted. The surface contour of the price tag and moulding trim and its use of the resilient cord are exactly the same as heretofore described in connection with Figures 1 and 2 of the drawings.

Figure 4:
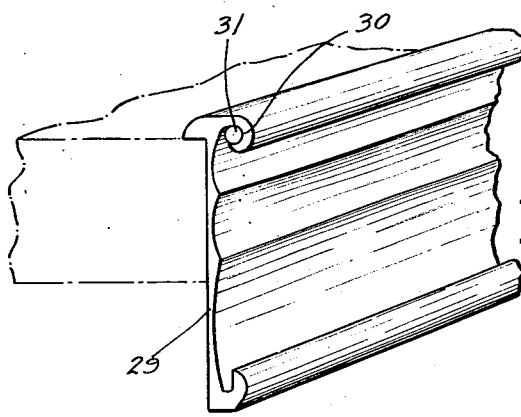
Figure 4 is a perspective view of a modified price tag and moulding trim.

In Figure 4 of the drawings a still further modification of the price tag and moulding trim may be seen wherein a vertical trim section 29 is formed with substantially the same surface configuration as heretofore disclosed in connection with Figures 1, 2 and 3 of the drawings with the exception that the concave areas are flatter and more generally conform with the over-all vertical formation of the modified trim section 29. The upper edge of the trim section 29 is provided with a partially closed channel 30 which encloses and retains a resilient cord 31. The price tags are positioned in and removed from the device in exactly the same manner as disclosed in connection with the heretofore disclosed forms of the device as in Figures 1, 2 and 3 of the drawings.

It will thus be seen that a price tag and moulding trim is disclosed which incorporates novel means of clamping or locking the price tags in position therein against accidental or deliberate displacement and at the same time provides for the satisfactory positioning and retention of under-sized price tags as well as those of normal or average size. Additionally it will be seen that the price tag and moulding trim possesses the advantage of being adaptable for upright or inverted positioning on a shelf edge; for example, on shelves below the eye level of the viewer, and on shelves above the eye level of the viewer it may be inverted so that the price tags therein are more readily visible. It will occur to those skilled in the art that the resilient cord of the device retained in the partially closed channel therein will work equally well in the upper or lower edge of the section or may alternately be applied to both upper and lower edges, as desired.

It will thus be seen that the price tag and moulding trim disclosed herein meets the several objects of the invention.

Having thus described my invention, what I claim is:

1. A price tag and moulding trim comprising a main body portion, rigid flanges extending along the opposite edges of the said main body portion defining channels for receiving the upper and lower edges of a price tag, one of the said flanges being inturned to form a partially closed channel having an entrance of reduced width, and a resilient cord fitted into the said partially closed channel through the entrance thereof and being initially of greater thickness than the width of the entrance and compressed when fitted into the channel and constituting means for resiliently clamping the price tag in position between the cord and the rear wall of the channel.

2. A price tag and moulding trim comprising a main body portion, rigid retaining flanges extending along the opposite edges of the said main body portion and forming channels for receiving the upper and lower edge portions of a price tag, and a cord of rubber-like material mounted in one of the said channels and frictionally gripping walls thereof and deformable transversely therein for resiliently clamping the price tag between the cord and the rear wall of the channel.

3. A price tag and moulding trim comprising a main body portion, rigid retaining flanges extending along the opposite edges of the said main body portion for receiving the upper and lower edges of a price tag, one of the said flanges being inturned to form a partially closed channel having an entrance of less width than the diameter of the channel, a rubber-like cord positioned in the said partially closed channel for resiliently clamping the price tag in position in the trim, said rubber-like cord being of a normal diameter greater than the entrance of said partially closed channel and held in the channel by frictional grip upon walls of the channel.

FRED G. SCHULER.

REFERENCES CITED

The following references are of record in the file of this patent:

UNITED STATES PATENTS

| Number | Name | Date |
| --- | --- | --- |
| 1,676,637 | Di Bona | July 10, 1928 |
| 1,759,781 | Fontannaz | May 20, 1930 |
| 2,003,343 | Davis | June 4, 1935 |
| 2,287,428 | Hopp et al. | June 23, 1942 |
| 2,352,100 | Hornung | June 20, 1944 |
| 2,489,089 | Graff et al. | Nov. 22, 1949 |
| 2,507,937 | Slavsky | May 16, 1950 |
| 2,514,046 | Gerbes | July 4, 1950 |
| 2,530,821 | Hubbel | Nov. 21, 1950 |